(12) United States Patent
Su

(10) Patent No.: US 11,067,132 B2
(45) Date of Patent: Jul. 20, 2021

(54) DRIVING TOOL WITH UNIVERSAL ROTATING STRUCTURE

(71) Applicant: Hong Ann Tool Industries Co., Ltd., Taichung (TW)

(72) Inventor: Cheng-Wei Su, Taichung (TW)

(73) Assignee: Hong Ann Tool Industries Co., Ltd., Taichung (TW)

( * ) Notice: Subject to any disclaimer, the term of this patent is extended or adjusted under 35 U.S.C. 154(b) by 391 days.

(21) Appl. No.: 16/047,124

(22) Filed: Jul. 27, 2018

(65) Prior Publication Data
US 2020/0018355 A1 Jan. 16, 2020

(30) Foreign Application Priority Data
Jul. 11, 2018 (TW) .................................. 107123943

(51) Int. Cl.
*F16D 3/18* (2006.01)
*B25B 23/00* (2006.01)

(52) U.S. Cl.
CPC .......... *F16D 3/185* (2013.01); *B25B 23/0014* (2013.01); *Y10S 403/06* (2013.01)

(58) Field of Classification Search
CPC .... F16D 3/185; F16D 3/223; F16D 2001/102; F16D 1/116; B25B 23/0014; Y10S 403/06

USPC ............................. 464/158, 159; 81/177.75
See application file for complete search history.

(56) References Cited

U.S. PATENT DOCUMENTS

| 6,290,606 | B1 * | 9/2001 | Hodson | ..................... F16D 3/20 464/159 |
| D664,032 | S * | 7/2012 | Su | |
| 2017/0082151 | A1 | 3/2017 | Su | |
| 2020/0248740 | A1 * | 8/2020 | Tsai | ........................ B25B 13/06 |

* cited by examiner

*Primary Examiner* — Greg Binda
(74) *Attorney, Agent, or Firm* — Alan D. Kamrath; Karin L. Williams; Mayer & Williams PC

(57) ABSTRACT

A driving tool with universal rotating structure includes a first drive joint member and a second drive joint member. The first drive joint member defines a compartment and at least one slot. The first end of the at least one slot includes is in communication with the compartment. The at least one slot extends through an outer periphery of the first drive joint member. The at least one slot includes a retaining member movably disposed therein. The outer periphery of the first drive joint member includes an enclosing ring disposed thereon. The enclosing ring is elastic and includes an inner periphery abutting against a side of the retaining member. The second drive joint member includes a head rotatably coupled to the first drive joint member. The head is disposed in the compartment. The head extends from a first end to a second end concavely along a second axis.

15 Claims, 11 Drawing Sheets

DRIVING TOOL WITH UNIVERSAL ROTATING STRUCTURE

BACKGROUND OF THE INVENTION

1. Field of the Invention

The present invention relates to a driving tool and, particularly to a driving tool including universal rotating structure.

2. Description of the Related Art

U.S. Patent Application Number 20170082151 shows a drive universal joint with anti jamming design. The drive universal joint includes a first drive joint member and a second drive joint member movably coupled to the first drive joint member. The first and second drive joint members are movable relative to each other between an aligned position and a maximum angled position. The first drive joint member includes a joining end defining a compartment with an inner peripheral wall thereof including six edges. Each of the edges has a convex contour. Each of the edges has an anti jamming design. The anti jamming design defines a recess extending radially into an apex region of the edge. The second drive joint member includes a joining end defining a body. The body is disposed in the compartment and enclosed by the six edges. The body includes an outer peripheral wall thereof including six sides. Each of the sides has a convex contour. One of the sides is constrained to face one of the edges and the anti jamming design on each of the edges avoids physical contact with each of sides to prevent the body of the second drive joint member from getting stuck in the compartment of the first drive joint member and unable. It is, however, difficult to manufacture the first and second drive joint members and the anti jamming design easily.

The present invention is, therefore, intended to obviate or at least alleviate the problems encountered in the prior art.

SUMMARY OF THE INVENTION

A driving tool with universal rotating structure includes a first drive joint member and a second drive joint member. The first drive joint member defines a compartment and at least one slot. The compartment extends from a first end to a second end along a first axis. The at least one slot extends from a first end to a second end radially to the first axis. The first end of the at least one slot includes a first open end in communication with the compartment. The second end of the at least one slot includes a second open end extending through an outer periphery of the first drive joint member. The at least one slot includes at least one retaining member movably disposed therein. The outer periphery of the first drive joint member includes an enclosing ring disposed thereon. The enclosing ring is elastic and includes an inner periphery abutting against a side of the at least one retaining member. The second drive joint member includes a head rotatably coupled to the first drive joint member. The head is disposed in the compartment. The head extends from a first end to a second end concavely along a second axis and includes a first, second, and third section sequentially along the second axis. The head has a width direction which extends radially to the second axis and the first and third sections have widths smaller than a width of the second section.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the public generally, and especially the scientists, engineers and practitioners in the art who are not familiar with patent or legal terms or phraseology, to determine quickly from a cursory inspection the nature and essence of the technical disclosure. The abstract is neither intended to define the invention, which is measured by the claims, nor is it intended to be limiting as to the scope of the invention in any way.

Other objectives, advantages, and new features of the present invention will become apparent from the following detailed description of the invention when considered in conjunction with the accompanied drawings.

DETAILED DESCRIPTION OF THE INVENTION

Figure 1:
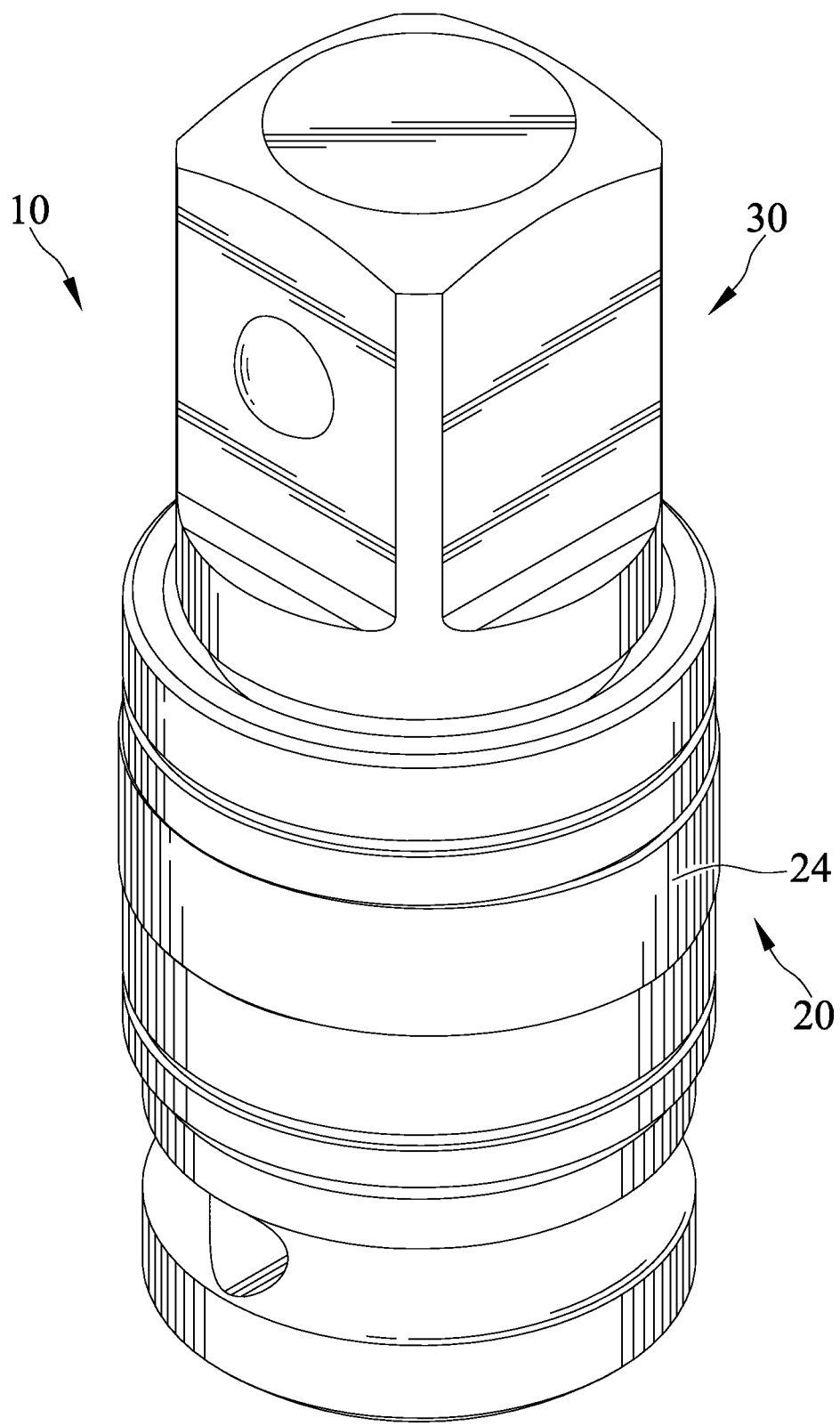
FIG. 1 is a perspective view of a driving tool with universal rotating structure in accordance with a first embodiment of the present invention.
Figure 2:
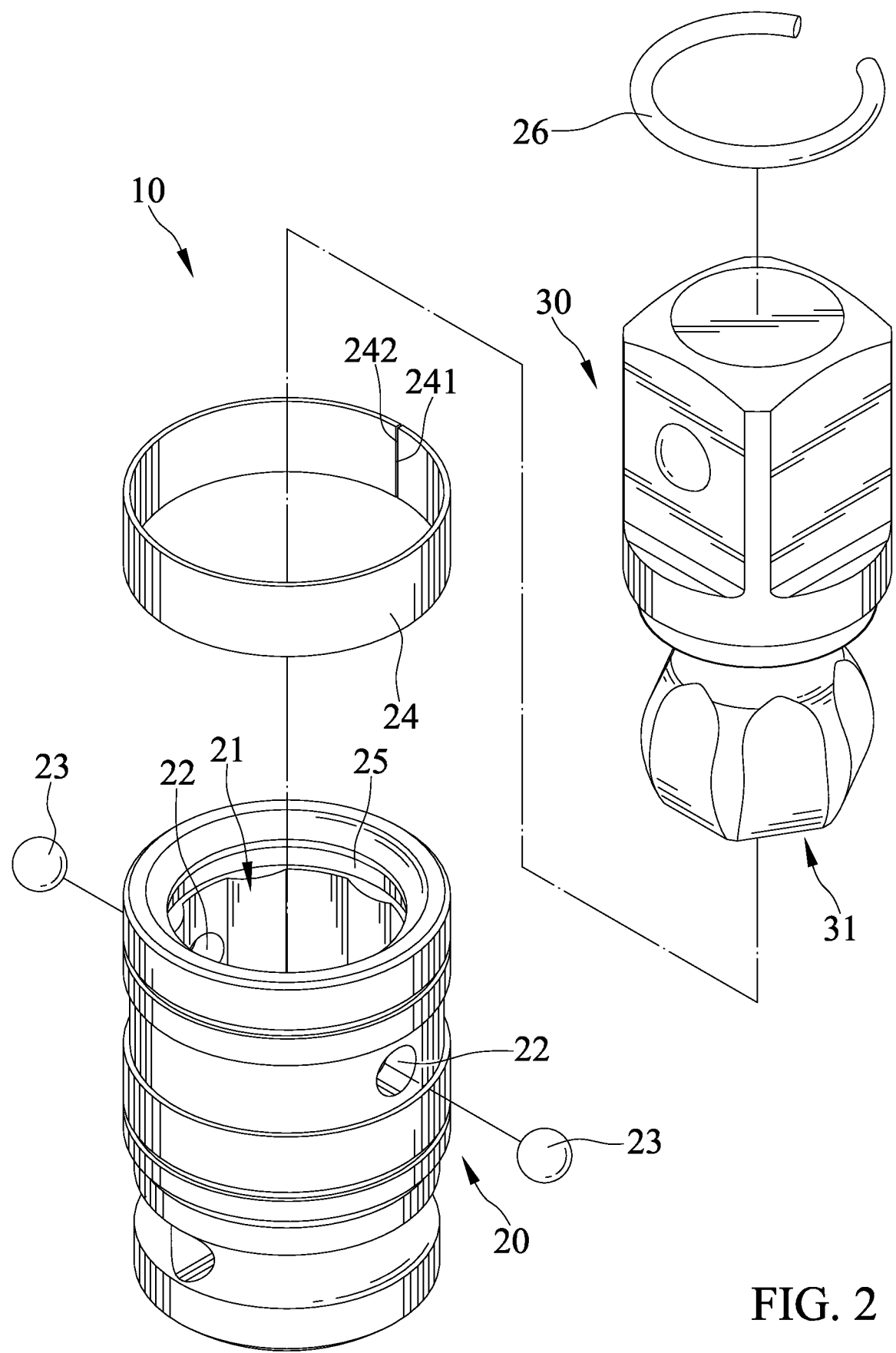
FIG. 2 is an exploded perspective view of the driving tool of FIG. 1.

FIGS. 1 through 6 show a driving tool 10 with universal rotating structure in accordance with a first embodiment of the present invention including a first drive joint member 20 and a second drive joint member 30.

The first drive joint member 20 defines a compartment 21 and at least one slot 22. The compartment 21 extends from a first end to a second end along a first axis L1. The compartment 21 is of a non-circular cross section taken radially to the first axis L1. The cross section of the compartment 21 includes a plurality of protruded surfaces 211 and a plurality of recessed surfaces 212 alternatively disposed circumferentially. The at least one slot 22 extends from a first end to a second end radially to the first axis L1. The first end of the at least one slot 22 includes a first open end in communication with the compartment 21. The second end of the at least one slot 22 includes a second open end extending through an outer periphery of the first drive joint member 20. The at least one slot 22 includes at least one retaining member 23 movably disposed therein. The first drive joint member 20 defines two one slots 22 diametrically oppositely.

The outer periphery of the first drive joint member 20 includes an enclosing ring 24 disposed thereon. The enclosing ring 24 is elastic and includes an inner periphery abutting against a side of the at least one retaining member 23. The enclosing ring 24 is disposed outside of the at least one slot 22 and is adapted to impose an elastic force, in a direction toward the at least one slot 22, on the at least one retaining member 23. The enclosing ring 24 extends from a first end 241 to a second end 242 circumferentially. The enclosing ring 24 surrounds the outer periphery of the first drive joint member 20. The enclosing ring 24 includes a gap between its first and second ends 241 and 242. The at least one retaining member 23 and the enclosing ring 24 are made of metal. The at least one retaining member 23 is a spherical ball.

The second drive joint member 30 including a head 31 rotatably coupled to the first drive joint member 20. The head 31 is disposed in the compartment 21. The head 31 extends from a first end to a second end concavely along a second axis L2 and includes a first, second, and third section 311, 312, and 313 sequentially along the second axis L2. The head 31 has a width direction which extends radially to the second axis L2 and the first and third sections 311 and 313 have widths smaller than a width of the second section 312. The first section 311 is adjacent to the first end of the head 31. The second section 312 is between its first and second ends of the head 31. The third section 313 is adjacent to the second end of the head 31. The head 31 has an outer periphery extending concavely from the first end to the second end and abuts the at least one retaining member 23.

The head 31 is of a non-circular cross section taken radially to the second axis L2. The head 31 is ball shaped and has hexagonal sides. The head 31 includes a plurality of first sides 314 abutting the plurality of protruded surfaces 211 respectively. The head 31 includes two of the plurality of first sides 314 being diametrically opposite and measures a first width W1 therebetween. The head 31 includes a plurality of second sides 315 facing the plurality of recessed surfaces 212 respectively. The head 31 includes two of the plurality of second sides being diametrically opposite and measures a second width W2. The second width W2 is greater than the first width W1. Each of the plurality of second sides 315 of the head 31 is not in contact with the corresponding one of the plurality of recessed surfaces 212. The head 31 applies a force on the at least one retaining member 23 in a direction opposite that of the elastic force.

The first drive joint member 20 also defines a groove 25 and includes anti-disengagement device 26 disposed in the groove 25. The anti-disengagement device 26 includes an outer periphery disposed in the groove 25 and an inner periphery disposed outside of the groove 25. A maximum width of the inner periphery of the anti-disengagement device 26 radial to the first axis L1 is smaller than the second width of the second section 312 of the head 31. The anti-disengagement device 26 is a clip. The clip is C-shaped.

Figure 3:
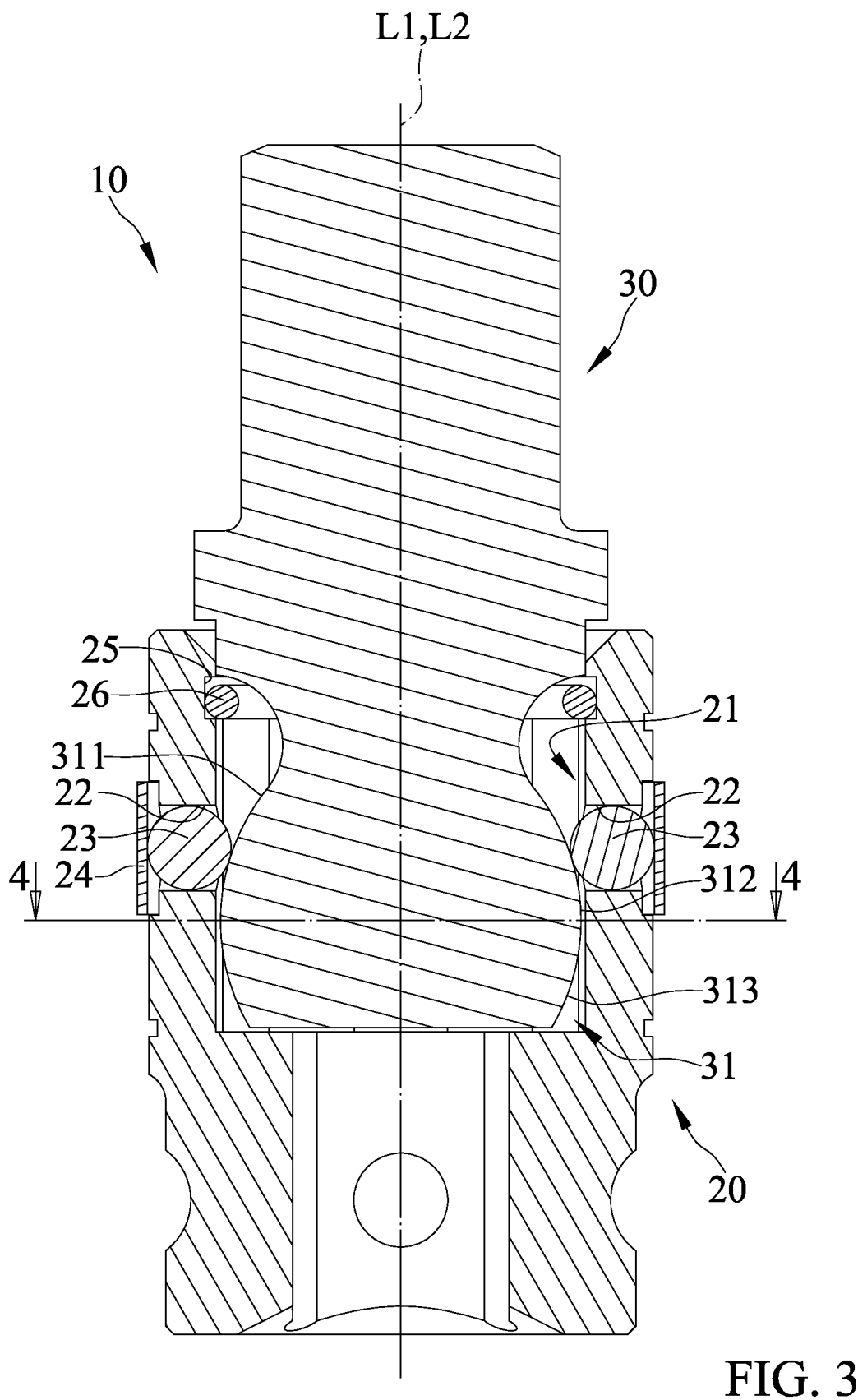
FIG. 3 is cross-sectional view showing the driving tool of FIG. 1 including a first drive joint member in a first position with respect to a second drive joint member, with the first drive joint member aligned with the second drive joint member.
Figure 4:
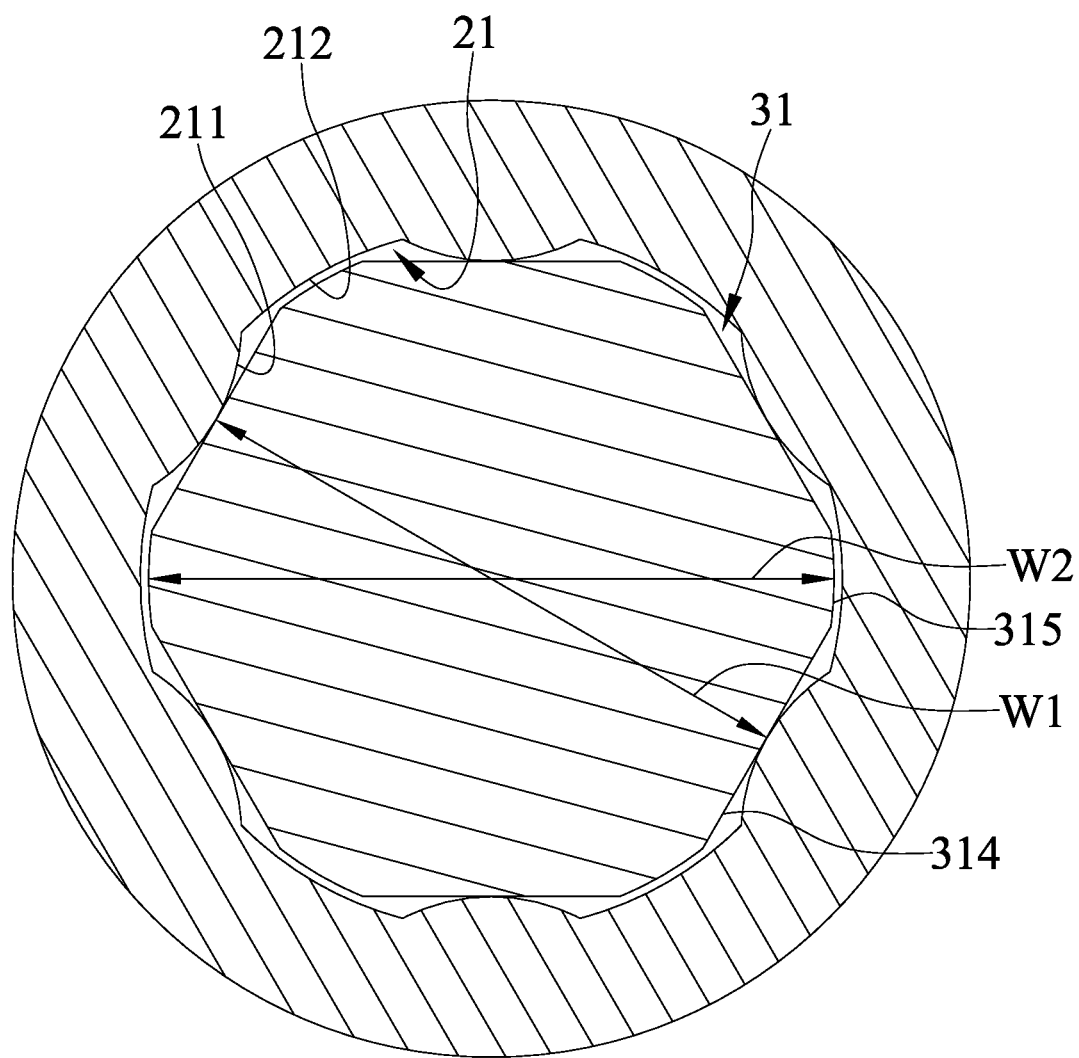
FIG. 4 is a cross-sectional view taken along line 4-4 of FIG. 3.
Figure 5:
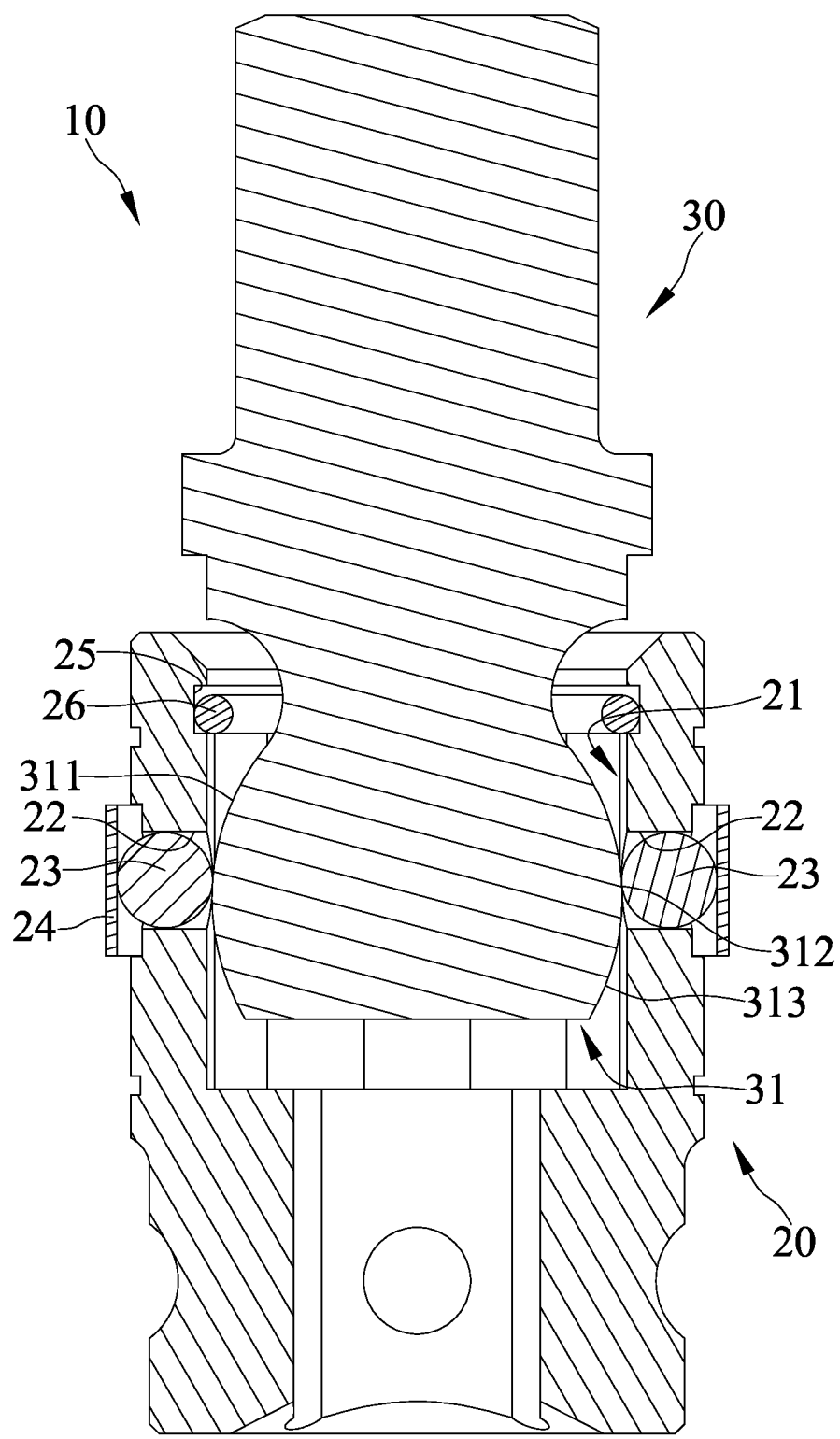
FIG. 5 is a cross-sectional view showing the driving tool of FIG. 1 including the first drive joint member in a position adapted to be tiled relative to the second drive joint member.

In this embodiment, the second drive joint member 30 is adapted to be moved relative to the first drive joint member 20 axially along the first axis L1, as shown in FIGS. 3 and 5. Additionally, as set forth, the enclosing ring 24 is elastic, the enclosing ring 24 can expand radially when the second drive joint member 30 moves from the position shown in FIG. 3 to the position shown in FIG. 5, i.e., the second section 312 of the head 31 abuts the at least one retaining member 23.

Figure 6:
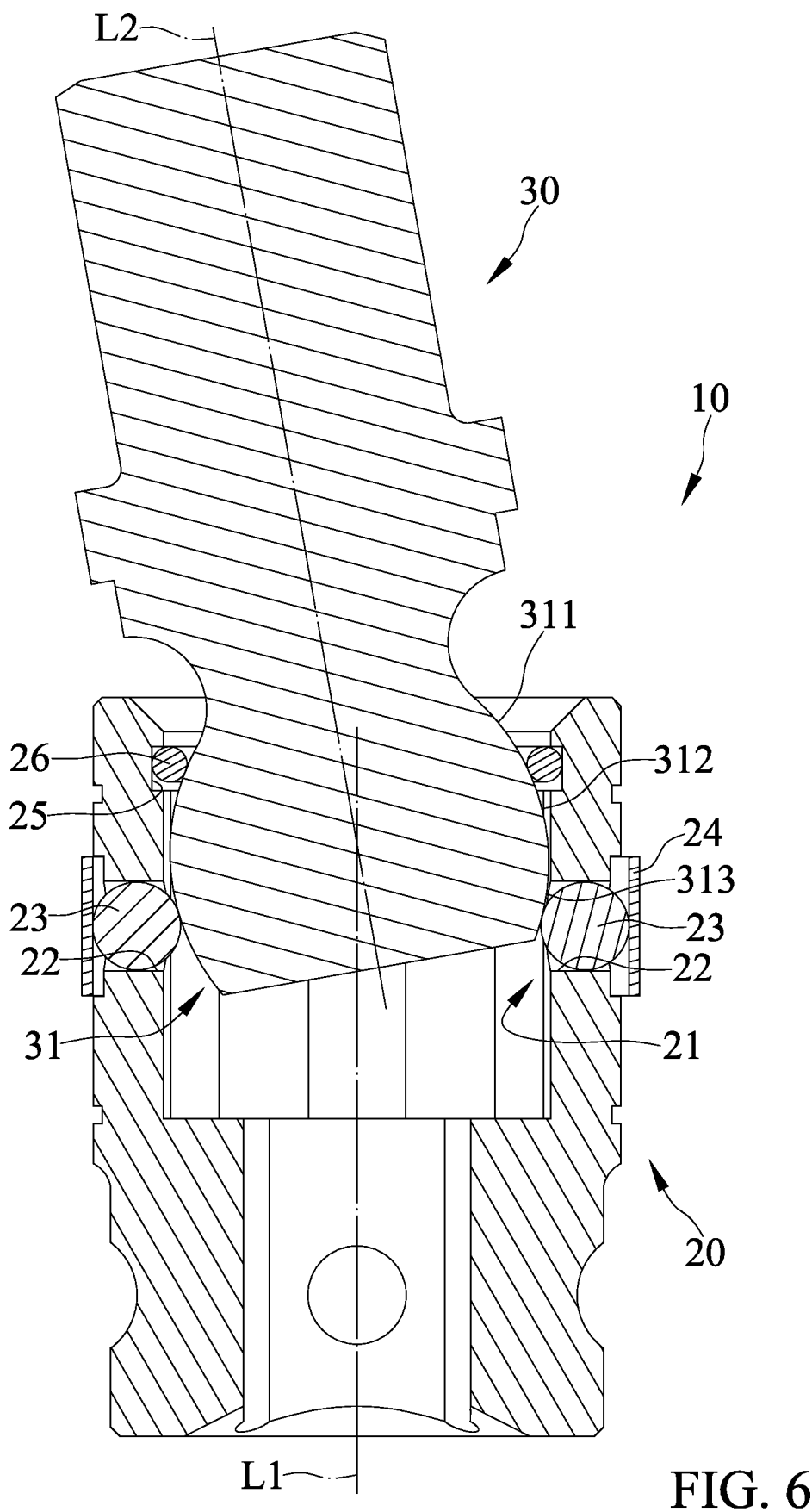
FIG. 6 is a cross-sectional view showing the driving tool of FIG. 1 including the first drive joint member in a second position with respect to the second drive joint member, with the first drive joint member angled to the second drive joint member.
Figure 7:
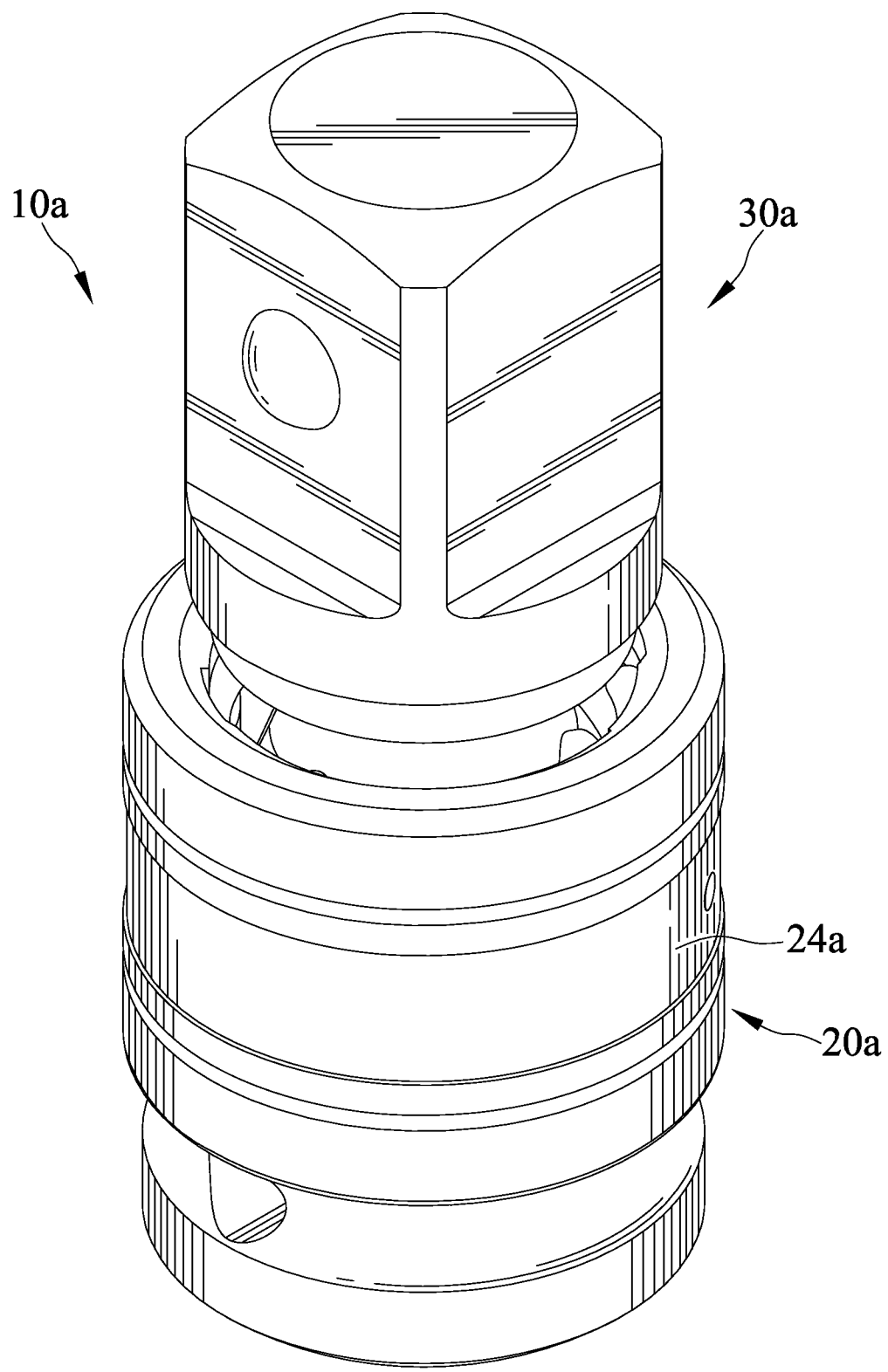
FIG. 7 is a perspective view of a driving tool with universal rotating structure in accordance with a second embodiment of the present invention.
Figure 8:
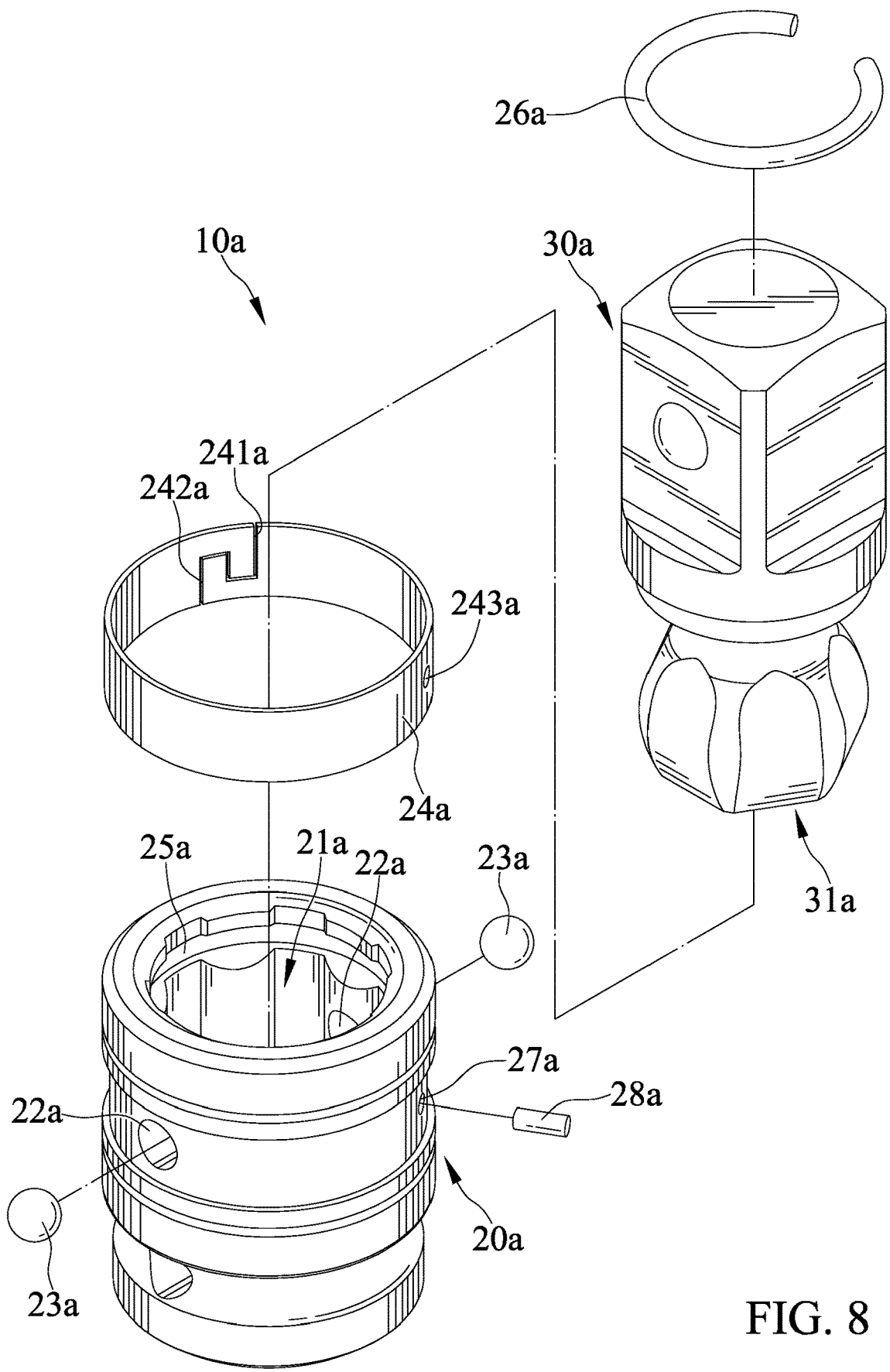
FIG. 8 is an exploded perspective view of the driving tool of FIG. 7.

After the second section 312 of the head 31 second drive joint member 30 is in contact with the at least one retaining member 23, as shown in FIG. 6, the second drive joint member 30 is rotatable from an aligned position to a maximum angled position. The first axis L1 is coaxial with the second axis L2 when the second drive joint member 30 is rotated to the aligned position. The second axis L2 is angled from the first axis L1 at a maximum angle when the second drive joint member 30 is rotated to the maximum angled position. The first and second drive joint members 20 and 30 are aligned when the second drive joint member 30 is rotated to the aligned position. The first and second drive joint members 20 and 30 are angled at the maximum angle when the second drive joint member 30 is rotated to the maximum angled position.

FIGS. 7 through 11 show a driving tool 10a with universal rotating structure in accordance with a second embodiment of the present invention, and the same numbers are used to correlate similar components of the first embodiment, but bearing a letter a. The driving tool 10a includes a first drive joint member 20a and a second drive joint member 30a. The first drive joint member 20a defines a compartment 21a and at least one slot 22a. The cross section of the compartment 21a includes a plurality of protruded surfaces 211a and a plurality of recessed surfaces 212a alternatively disposed circumferentially. The compartment 21 extends from a first end to a second end along a first axis L1. The at least one slot 22a includes at least one retaining member 23a movably disposed therein. The outer periphery of the first drive joint member 20a includes an enclosing ring 24a disposed thereon. The enclosing ring 24a is elastic and includes an inner periphery abutting against a side of the at least one retaining member 23a. The enclosing ring 24a extends from a first end 241a to a second end 242a circumferentially. The enclosing ring 24a includes a gap between its first and second ends 241a and 242a. The first drive joint member 20a also defines a groove 25a and includes anti-disengagement device 26a disposed in the groove 25a. The second drive joint member 30a including a head 31a rotatably coupled to the first drive joint member 20a. The head 31 includes a plurality of first sides 314a abutting the plurality of protruded surfaces 211a respectively. The head 31a includes two of the plurality of first sides 314a being diametrically opposite and measures a first width W1 therebetween. The head 31a includes a plurality of second sides 315a facing the plurality of recessed surfaces 212a respectively. The head 31a includes two of the plurality of second sides being diametrically opposite and measures a second width W2. The head 31a includes two of the plurality of second sides being diametrically opposite and measures a second width W2. The second width W2 is greater than the first width W1. Each of the plurality of second sides 315a of the head 31a is not in contact with the corresponding one of the plurality of recessed surfaces 212a. The head 31a extends from a first end to a second end concavely along a second axis L2 and includes a first, second, and third section 311a, 312a, and 313a sequentially along the second axis L2.

Figure 9:
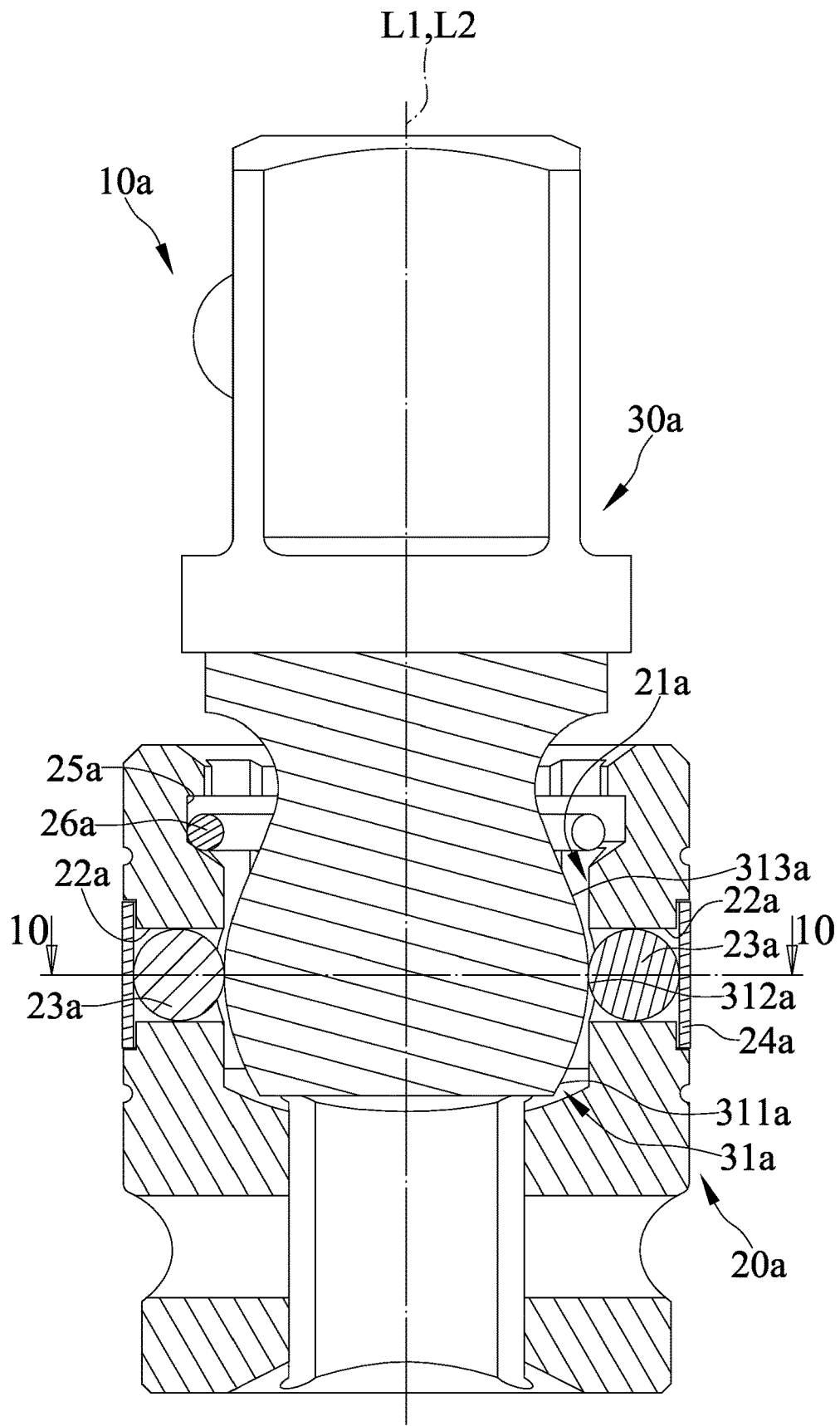
FIG. 9 is cross-sectional view showing the driving tool of FIG. 7 including a first drive joint member in a first position with respect to a second drive joint member, with the first drive joint member aligned with the second drive joint member.
Figure 10:
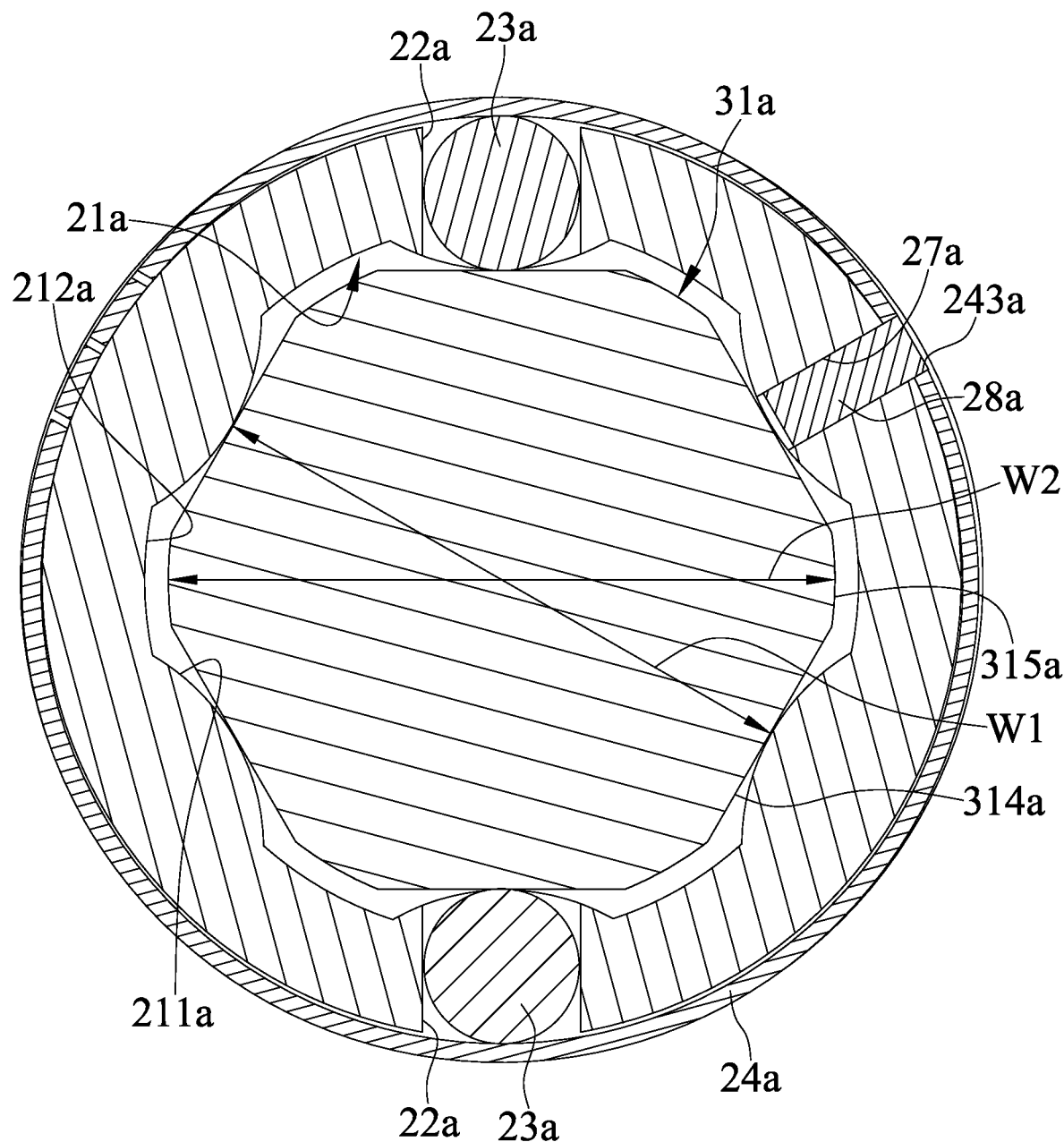
FIG. 10 is a cross-sectional view taken along line 10-10 of FIG. 9.
Figure 11:
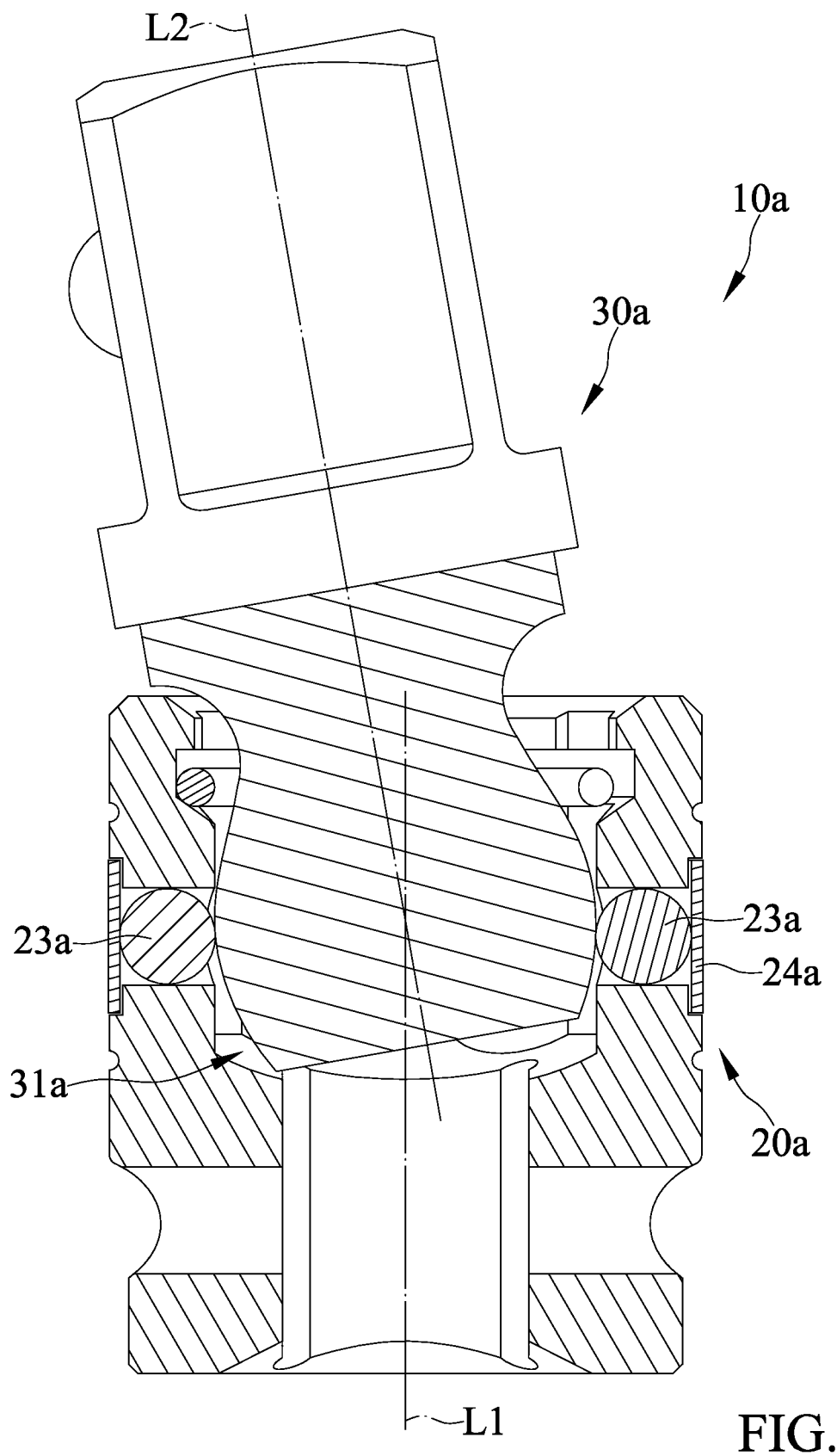
FIG. 11 is a cross-sectional view showing the driving tool of FIG. 7 including the first drive joint member in a second position with respect to the second drive joint member, with the first drive joint member angled to the second drive joint member.

The second embodiment differentiates from the first embodiment in that the driving tool 10a includes a positioning device 28a to position enclosing ring 24a. The first drive joint member 20a and the enclosing ring 24a respectively define a first hole 27a and a second hole 243a and the positioning device 28a is inserted into the first and second holes 27a and 243a. The first hole 27a extends from a first end to a second end radially to the first axis L1. The positioning device 28a keeps the enclosing ring 24a in position and prevents it from rotating relative to the first drive joint member 20a. Furthermore, FIG. 9 shows that when the second section 312a of the head 31a abuts the at least one retaining member 23a, the second drive joint member 30a is rotated to an aligned position, i.e., the first and second drive joint members 20a and 30a are aligned. FIG. 11 shows that the second drive joint member 30a is rotated to an angled position, i.e., the first and second drive joint members 20a and 30a are angled. As shown in FIGS. 9 and 11, the enclosing ring 24a is not expanded radially.

In view of the foregoing, with the elastic retaining member 23 and 23a, the second drive joint members 30 and 30a is elastically retained and buffered, thereby enabling it to rotate smoothly during operation.

The foregoing is merely illustrative of the principles of this invention, and various modifications can be made by those skilled in the art without departing from the scope and spirit of the invention.

What is claimed is:

1. A driving tool with universal rotating structure comprising:
   a first drive joint member defining a compartment and at least one slot, wherein the compartment extends from a first end to a second end along a first axis, wherein the at least one slot extends from a first end to a second end radially to the first axis, wherein the first end of the at least one slot includes a first open end in communication with the compartment, wherein the second end of the at least one slot includes a second open end extending through an outer periphery of the first drive joint member, wherein the at least one slot includes at least one retaining member movably disposed therein, wherein the outer periphery of the first drive joint member includes an enclosing ring disposed thereon, and wherein the enclosing ring is elastic and includes an inner periphery abutting against a side of the at least one retaining member; and
   a second drive joint member including a head rotatably coupled to the first drive joint member, wherein the head is disposed in the compartment, wherein the head extends from a first end to a second end concavely along a second axis and includes a first, second, and third section sequentially along the second axis, wherein the head has a width direction which extends radially to the second axis and the first and third sections have widths smaller than a width of the second section,
   wherein the enclosing ring extends from a first end to a second end circumferentially, wherein the enclosing ring surrounds the outer periphery of the first drive joint member, and wherein the enclosing ring includes a gap between its first and second ends.

2. The driving tool with universal rotating structure as claimed in claim 1, wherein the enclosing ring is disposed outside of the at least one slot and is adapted to impose an elastic force, in a direction toward the at least one slot, on the at least one retaining member.

3. The driving tool with universal rotating structure as claimed in claim 1, wherein the second drive joint member is rotatable from an aligned position to a maximum angled position, wherein the first axis is coaxial with the second axis when the second drive joint member is rotated to the aligned position, and wherein the second axis is angled from the first axis at a maximum angle when the second drive joint member is rotated to the maximum angled position.

4. The driving tool with universal rotating structure as claimed in claim 3, wherein the second drive joint member is adapted to be moved relative to the first drive joint member axially along the first axis, and wherein the enclosing ring expand radially when the second drive joint member is rotated from the aligned position to the angled position.

5. The driving tool with universal rotating structure as claimed in claim 1, wherein the compartment is of a non-circular cross section taken radially to the first axis, and wherein the head is of a non-circular cross section taken radially to the second axis.

6. The driving tool with universal rotating structure as claimed in claim 1, wherein the first drive joint member defines two one slots diametrically oppositely.

7. A driving tool with universal rotating structure comprising:
   a first drive joint member defining a compartment and at least one slot, wherein the compartment extends from a first end to a second end along a first axis, wherein the at least one slot extends from a first end to a second end radially to the first axis, wherein the first end of the at least one slot includes a first open end in communication with the compartment, wherein the second end of the at least one slot includes a second open end extending through an outer periphery of the first drive joint member, wherein the at least one slot includes at least one retaining member movably disposed therein, wherein the outer periphery of the first drive joint member includes an enclosing ring disposed thereon, and wherein the enclosing ring is elastic and includes an inner periphery abutting against a side of the at least one retaining member;
   a second drive joint member including a head rotatably coupled to the first drive joint member, wherein the head is disposed in the compartment, wherein the head extends from a first end to a second end concavely along a second axis and includes a first, second, and third section sequentially along the second axis, wherein the head has a width direction which extends radially to the second axis and the first and third sections have widths smaller than a width of the second section; and
a positioning device to position the enclosing ring, wherein the first drive joint member and the enclosing ring respectively define a first hole and a second hole and the positioning device is inserted into the first and second holes.

8. The driving tool with universal rotating structure as claimed in claim 7, wherein the first hole extends from a first end to a second end radially to the first axis.

9. A driving tool with universal rotating structure comprising:
a first drive joint member defining a compartment and at least one slot, wherein the compartment extends from a first end to a second end along a first axis, wherein the at least one slot extends from a first end to a second end radially to the first axis, wherein the first end of the at least one slot includes a first open end in communication with the compartment, wherein the second end of the at least one slot includes a second open end extending through an outer periphery of the first drive joint member, wherein the at least one slot includes at least one retaining member movably disposed therein, wherein the outer periphery of the first drive joint member includes an enclosing ring disposed thereon, and wherein the enclosing ring is elastic and includes an inner periphery abutting against a side of the at least one retaining member; and
a second drive joint member including a head rotatably coupled to the first drive joint member, wherein the head is disposed in the compartment, wherein the head extends from a first end to a second end concavely along a second axis and includes a first, second, and third section sequentially along the second axis, wherein the head has a width direction which extends radially to the second axis and the first and third sections have widths smaller than a width of the second section,
wherein the compartment is of a non-circular cross section taken radially to the first axis, and wherein the head is of a non-circular cross section taken radially to the second axis,
wherein the cross section of the compartment includes a plurality of protruded surfaces and a plurality of recessed surfaces alternatively disposed circumferentially, wherein the head includes a plurality of first sides abutting the plurality of protruded surfaces respectively, wherein the head includes two of the plurality of first sides being diametrically opposite and measures a first width therebetween, wherein the head includes a plurality of second sides facing the plurality of recessed surfaces respectively, wherein the head includes two of the plurality of second sides being diametrically opposite and measures a second width, and wherein the second width is greater than the first width, and
wherein the enclosing ring extends from a first end to a second end circumferentially, wherein the enclosing ring surrounds the outer periphery of the first drive joint member, and wherein the enclosing ring includes a gap between its first and second ends.

10. The driving tool with universal rotating structure as claimed in claim 9, wherein each of the plurality of second sides of the head is not in contact with the corresponding one of the plurality of recessed surfaces.

11. A driving tool with universal rotating structure comprising:
a first drive joint member defining a compartment and at least one slot, wherein the compartment extends from a first end to a second end along a first axis, wherein the at least one slot extends from a first end to a second end radially to the first axis, wherein the first end of the at least one slot includes a first open end in communication with the compartment, wherein the second end of the at least one slot includes a second open end extending through an outer periphery of the first drive joint member, wherein the at least one slot includes at least one retaining member movably disposed therein, wherein the outer periphery of the first drive joint member includes an enclosing ring disposed thereon, and wherein the enclosing ring is elastic and includes an inner periphery abutting against a side of the at least one retaining member; and
a second drive joint member including a head rotatably coupled to the first drive joint member, wherein the head is disposed in the compartment, wherein the head extends from a first end to a second end concavely along a second axis and includes a first, second, and third section sequentially along the second axis, wherein the head has a width direction which extends radially to the second axis and the first and third sections have widths smaller than a width of the second section,
wherein the first drive joint member defines a groove and includes anti-disengagement device disposed in the groove, wherein the anti-disengagement device includes an outer periphery disposed in the groove and an inner periphery disposed outside of the groove, and wherein a maximum width of the inner periphery of the anti-disengagement device radial to the first axis is smaller than the second width of the second section of the head.

12. The driving tool with universal rotating structure as claimed in claim 11, wherein the enclosing ring extends from a first end to a second end circumferentially, wherein the enclosing ring surrounds the outer periphery of the first drive joint member, and wherein the enclosing ring includes a gap between its first and second ends.

13. The driving tool with universal rotating structure as claimed in claim 11, wherein the head is ball shaped and has hexagonal sides.

14. The driving tool with universal rotating structure as claimed in claim 13, wherein the at least one retaining member and the enclosing ring are made of metal.

15. A driving tool with universal rotating structure comprising:
a first drive joint member defining a compartment and at least one slot, wherein the compartment extends from a first end to a second end along a first axis, wherein the at least one slot extends from a first end to a second end radially to the first axis, wherein the first end of the at least one slot includes a first open end in communication with the compartment, wherein the second end of the at least one slot includes a second open end extending through an outer periphery of the first drive joint member, wherein the at least one slot includes at least one retaining member movably disposed therein, wherein the outer periphery of the first drive joint member includes an enclosing ring disposed thereon, and wherein the enclosing ring is elastic and includes an inner periphery abutting against a side of the at least one retaining member; and a second drive joint member including a head rotatably coupled to the first drive joint member, wherein the head is disposed in the compartment, wherein the head extends from a first end to a second end concavely along a second axis and includes a first, second, and third section sequentially along the second axis, wherein the head has a width direction which extends radially to the second axis and the first and third sections have widths smaller than a width of the second section, wherein the second drive joint member is rotatable from an aligned position to a maximum angled position, wherein the first axis is coaxial with the second axis when the second drive joint member is rotated to the aligned position, and wherein the second axis is angled from the first axis at a maximum angle when the second drive joint member is rotated to the maximum angled position, and wherein the second section of the head abuts the at least one retaining member when the second drive joint member is rotated to the aligned position, and wherein the enclosing ring is not expanded radially when the second drive joint member is rotated from the aligned position to the angled position.

* * * * *